M. MURPHY.
FIRELESS COOK STOVE.
APPLICATION FILED FEB. 20, 1915.
1,164,845.
Patented Dec. 21, 1915.
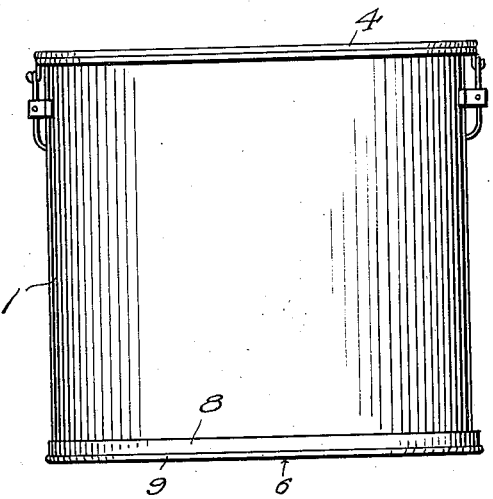
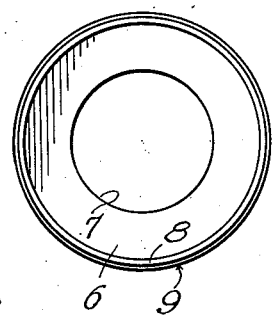
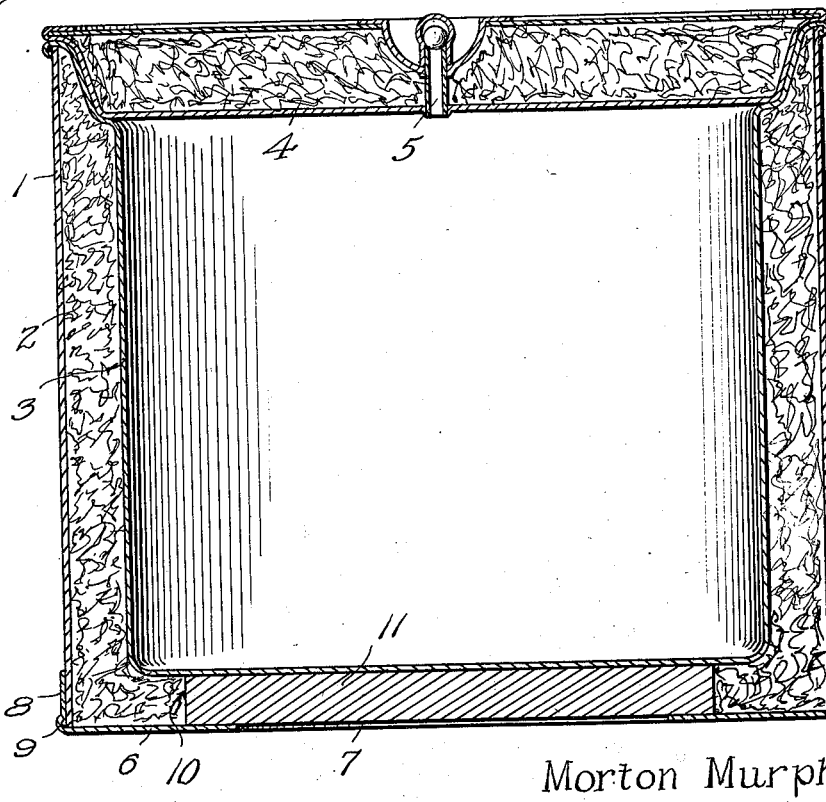
Inventor
Morton Murphy

UNITED STATES PATENT OFFICE.

MORTON MURPHY, OF JANESVILLE, WISCONSIN.

FIRELESS COOK-STOVE.

1,164,845. Specification of Letters Patent. Patented Dec. 21, 1915.

Application filed February 20, 1915. Serial No. 9,649.

*To all whom it may concern:*

Be it known that I, MORTON MURPHY, a citizen of the United States of America, residing at Janesville, in the county of Rock and State of Wisconsin, have invented certain new and useful Improvements in Fireless Cook-Stoves, of which the following is a specification, reference being had therein to the accompanying drawing.

This invention relates to fireless cookers or cookstoves, and has for its object the production of a simple and efficient cooker or cookstove, wherein the heating plate or disk may be easily and readily removed therefrom when so desired for the purpose of renewing the plate or placing a new one in the bottom of the casing of the cooker.

Another object of this invention is the production of a simple and efficient means for retaining the heating disk or plate within the bottom of the cooker in such a manner as to allow the flame or heat from the stove upon which the cooker is adapted to be placed to readily heat the heating disk or plate, and at the same time heat the interior of the cooker.

It should be understood that the present device is especially illustrated as embodying only one well, but it should be understood that any number of wells may be employed without departing from the spirit of the invention, but the present device as stated above is especially adapted for a one well cooker wherein the material to be cooked may be placed directly within the well of the cooker without employing an additional receptacle.

With these and other objects in view this invention consists of certain novel combinations, constructions, and arrangements of parts as will be hereinafter fully described and claimed.

In the accompanying drawing—Figure 1 is a side elevation of the cooker. Fig. 2 is an enlarged vertical section therethrough. Fig. 3 is a bottom plan view of the heating disk retaining plate which is detachably secured to the bottom of a fireless cooker or cookstove.

By referring to the drawing it will be seen that 1 designates the outer wall of the cooker or cookstove which is provided with the usual insulating material 2 upon the inner face thereof. A seamless aluminum well 3 is placed within the outer casing 1 as clearly illustrated, and as is usual with such cookers, a cover 4 is detachably secured to the top of the casing 1 and is provided with an escapement valve mechanism 5 as illustrated clearly in Fig. 2 of the drawing.

The bottom of the casing 1 is normally closed by means of a detachable or removable plate 6, which plate is provided with a centrally located aperture 7. The plate 6 is provided with an upwardly extending annular flange 8 around the edge thereof, which flange is adapted to fit snugly over the lower end of the casing 1 and thereby firmly and frictionally hold the plate 6 in engagement with the casing 1. A reinforced beaded portion 9 is formed around the edge of the plate 6 at the point of junction between the flange 8 and the body of the plate 6 as clearly illustrated in Fig. 2 for the purpose of reinforcing the annular flange 8.

The insulating material 2 forming a portion of the body of the fireless cooker is provided with a socket 10 formed therein, which socket is adapted to receive a heating disk 11 formed of soapstone or other suitable material. This disk 11 is preferably circular in shape, although the same may be made of any suitable or desired shape, and as clearly illustrated in Fig. 2 it will be seen that this disk 11 overhangs the edge of the aperture 7 so as to permit the plate 6 to conveniently and easily hold the heating disk 11 in an anchored position against accidental movement between the bottom of the seamless aluminum well 3 and the upper face of the plate 6.

It should be understood, as is clearly illustrated, that the radiator or heating disk 11 may be readily removed should the same break, and in this manner may be readily replaced by a new radiator or heating disk.

It is a well known fact that in all fireless cookers or cookstoves that it is necessary to heat the soapstone, disk or radiator over a flame and place the radiator in the compartment, and then place the kettle containing the food on top of the radiator for the purpose of cooking the food, after which it becomes necessary to remove the kettle and radiator, then clean the kettle and clean and wipe out the compartment in which the food was cooked.

In the present cooker as illustrated and described, it will be seen that the radiator will at all times be carried by the body except when it is desired to be replaced by a new radiator, thereby obviating the necessity of handling the radiator, in view of the fact that the entire cooker may be placed over the flame of a gas range or upon the top of the stove so as to allow the heat from the stove to be absorbed by the radiator disk 11. Furthermore, it should be understood that the food to be cooked may be placed directly in the seamless aluminum well 3, thereby doing away with the necessity of employing an additional receptacle.

By means of the present device approximately seventy-five per cent. of the labor necessary in the ordinary use of a fireless cooker or cookstove is eliminated.

Of course, it should be understood that if it be so desired the ordinary baking racks may be placed within the seamless aluminum well for the purpose of baking without departing from the spirit of the invention, for as stated above, the principal object of the present invention resides in the construction and idea of the removable plate 6 carried by the bottom of the casing 1.

Having thus described the invention what is claimed as new, is:—

A fireless cooker of the class described comprising an inner cooking vessel, an outer casing concentrically arranged, the space between being filled with heat insulating material, said casing extending below the bottom of the cooking vessel, a removable cover having a central aperture, on the lower end of the casing, and a removable radiator held in place between said cover and the bottom of said cooking vessel.

In testimony whereof I hereunto affix my signature in presence of two witnesses.

MORTON MURPHY.

Witnesses:
  LUELLA J. HAWK,
  MARGIE B. ACLY.